Figure 1:
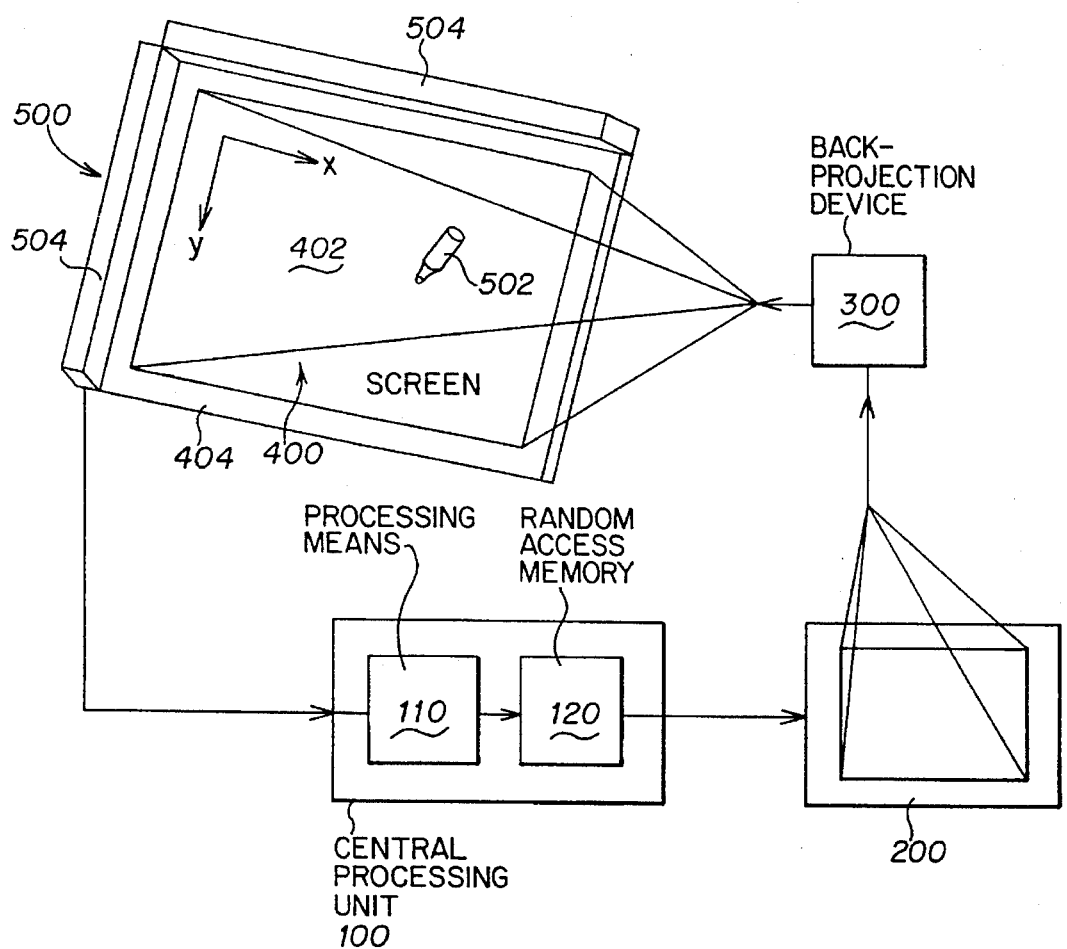

United States Patent [19]

D'Aviau de Piolant

[11] Patent Number: 5,557,301
[45] Date of Patent: Sep. 17, 1996

[54] GRAPHIC DRAWING SYSTEM

[76] Inventor: Jean-Louis D'Aviau de Piolant, 35 Allée des Trides, 33610 Cestas, France

[21] Appl. No.: 150,061
[22] PCT Filed: May 18, 1992
[86] PCT No.: PCT/FR92/00442
  § 371 Date: Nov. 17, 1993
  § 102(e) Date: Nov. 17, 1993
[87] PCT Pub. No.: WO92/21103
  PCT Pub. Date: Nov. 26, 1992

[30] Foreign Application Priority Data

May 17, 1991 [FR] France .................... 91/06010

[51] Int. Cl.⁶ .................................... G09G 5/00
[52] U.S. Cl. ........................... 345/179; 178/18
[58] Field of Search ....................... 345/179, 156, 345/18 D, 181, 183; 178/18, 19

[56] References Cited

U.S. PATENT DOCUMENTS

| 3,611,430 | 10/1971 | George et al. | 346/140 |
| 3,917,955 | 11/1975 | Inuiya | 250/549 |
| 4,318,096 | 3/1982 | Thornburg et al. | 345/179 |
| 4,550,438 | 10/1985 | Conuis et al. | 345/179 |
| 4,633,436 | 12/1986 | Flurry | 345/179 |
| 4,712,937 | 12/1987 | Schmidt et al. | 401/213 |
| 4,814,552 | 3/1989 | Stefik et al. | 178/18 |
| 4,817,034 | 3/1989 | Hardin, Sr. et al | 178/18 |
| 5,051,736 | 9/1991 | Bennett et al. | 178/18 |

FOREIGN PATENT DOCUMENTS

| 0151959 | 8/1985 | European Pat. Off. . | |
| 0199526 | 10/1986 | European Pat. Off. | G06F 3/033 |
| 0349322 | 1/1990 | European Pat. Off. | G06F 3/033 |
| 2551542 | 3/1985 | France . | |
| 60-221875 | 11/1985 | Japan . | |
| 61-117621 | 6/1986 | Japan . | |
| 2018427 | 10/1979 | United Kingdom | G01S 5/18 |

Primary Examiner—Ulysses Weldon
Assistant Examiner—Amare Mengistu
Attorney, Agent, or Firm—Wolf, Greenfield & Sacks, P.C.

[57] ABSTRACT

A graphic drawing system includes a drawing surface and a stylus capable of being moved over the surface in order to simulate plotted lines. The coordinates of the stylus in the plane of the surface are determined with respect to a reference, and a digital image can be created or updated using these coordinates. This digital image can be displayed on a screen. An angle of the stylus with respect to the drawing surface can determine a line width in the image.

24 Claims, 4 Drawing Sheets

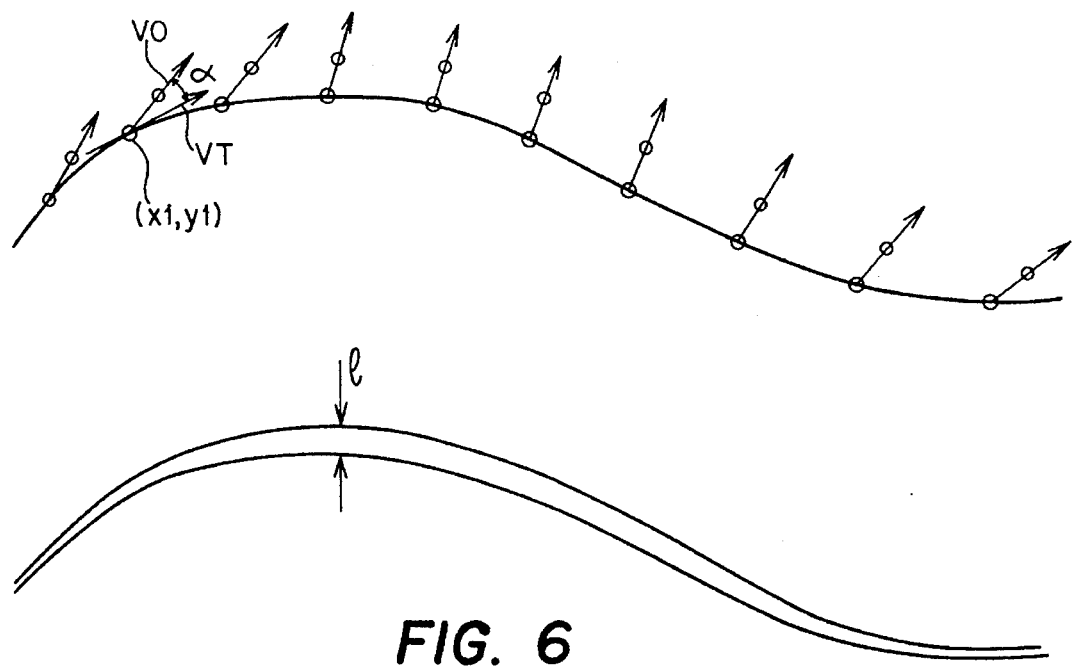
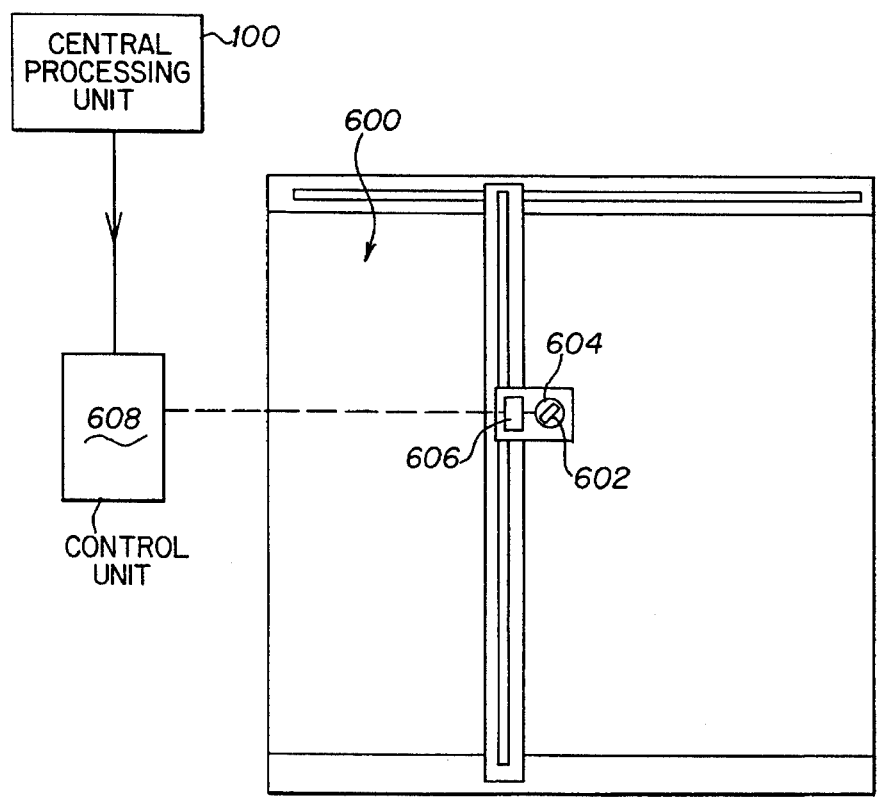
FIG. 6
FIG. 7

GRAPHIC DRAWING SYSTEM

The present invention relates in a general manner to a graphics drawing system of the type comprising:

a drawing surface;

a stylus capable of being moved over the surface in order to simulate plotted lines;

means for determining the coordinates of the stylus in the plane of the surface with respect to a reference;

processing means connected to the coordinate determination means in order to create or update a digital image by using the coordinates of the stylus; and means for displaying the said image on a screen, these display means being connected to the processing means.

In such a known system, the width of the plotted line produced remains constant whatever the plotted line produced. This constitutes a significant limitation, especially for graphics creators, as in this case it is impossible to obtain thick strokes and thin strokes on the image formed.

The present invention aims to overcome this drawback of the prior art.

Another object of the invention is to provide a system enabling the user to go beyond the often small size of a cathode ray tube screen or a liquid-crystal screen, while at the same time producing the plotted lines directly on the image as it is being formed.

Yet another object of the invention is to provide printing means enabling the thick and thin strokes of simulated plotted lines to be reproduced on the drawing surface.

For this purpose, the invention provides a graphics drawing system of the type mentioned in the introduction, characterized in that the means for determining the coordinates of the stylus comprise means to determine the coordinates of a tip of the stylus and means to determine an orientation vector of the stylus enabling in its turn the width of the simulated plotted line to be determined.

Figure 2:
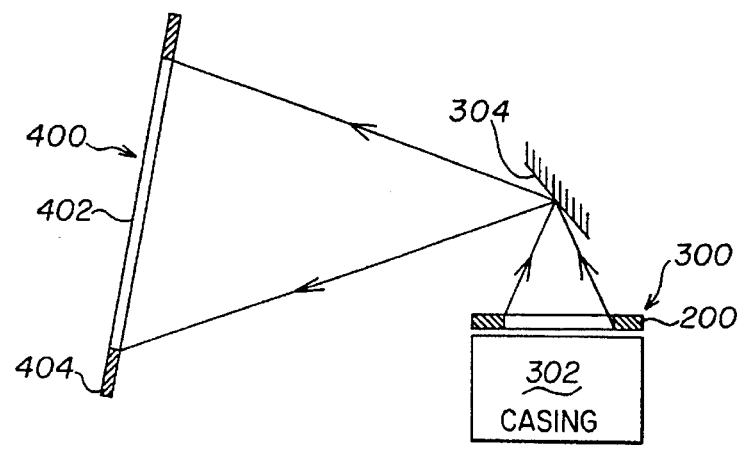
Figure 3:
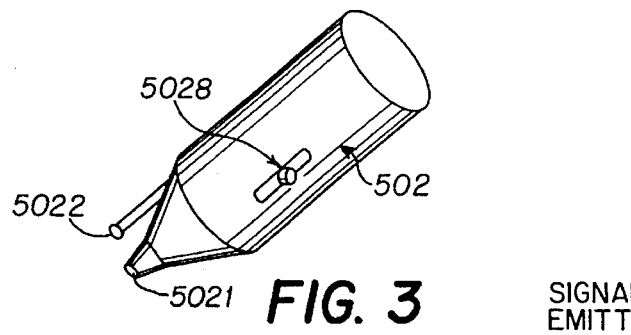
Figure 4:
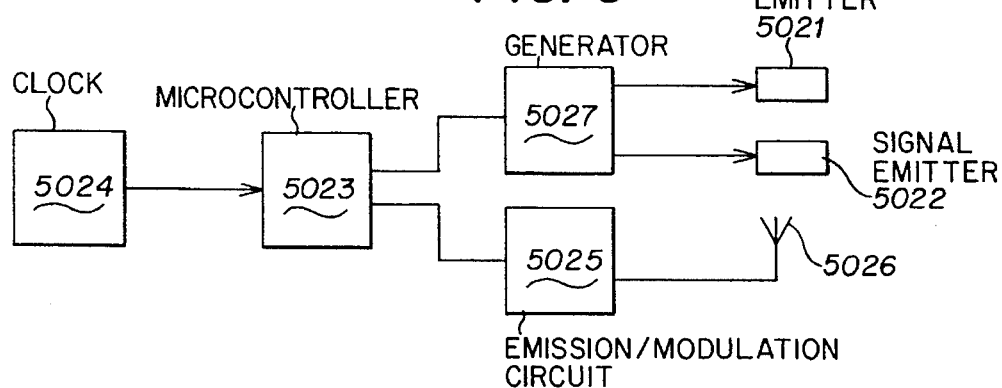

Other features, purposes and advantages of the present invention will become clearer upon reading the following detailed description of a preferred embodiment thereof, given by way of example with reference to the appended drawings in which:

FIG. 1 is a diagrammatic overall view, in perspective, of a graphics drawing system according to the invention, FIG. 2 is a view, in side elevation, of a possible embodiment of part of the system of FIG. 1, FIG. 3 is a view, in perspective, of a stylus forming part of the system of the invention, FIG. 4 illustrates, in block-diagram form, the design of the stylus of FIG. 3 from the electrical standpoint.

Figure 5:
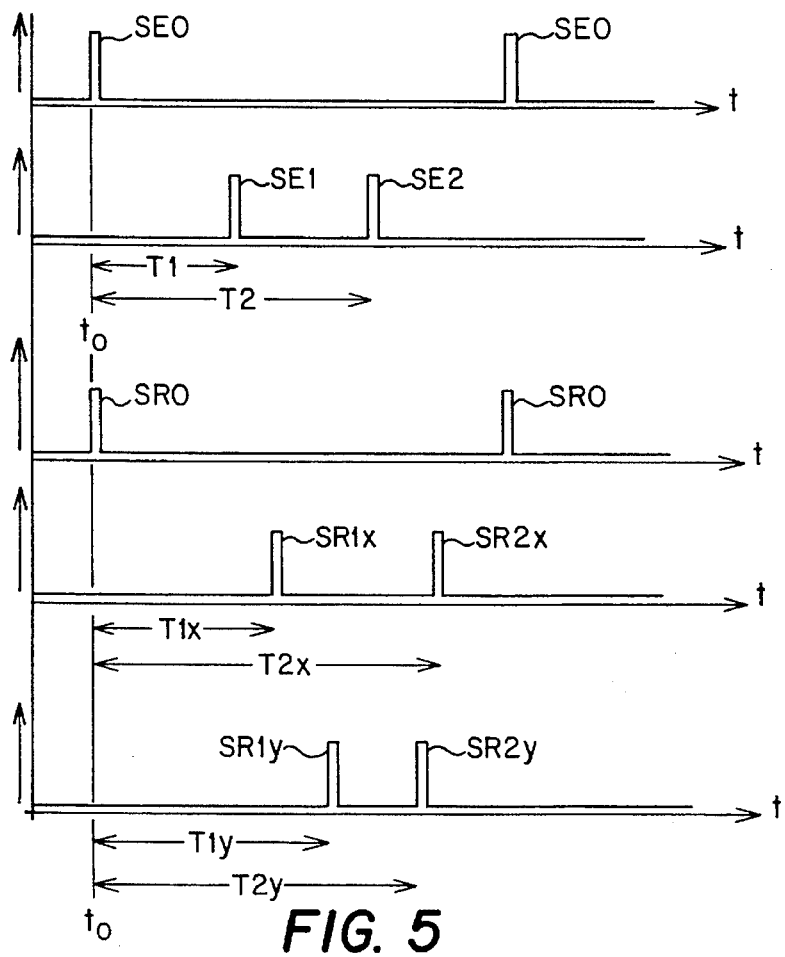
Figure 8:
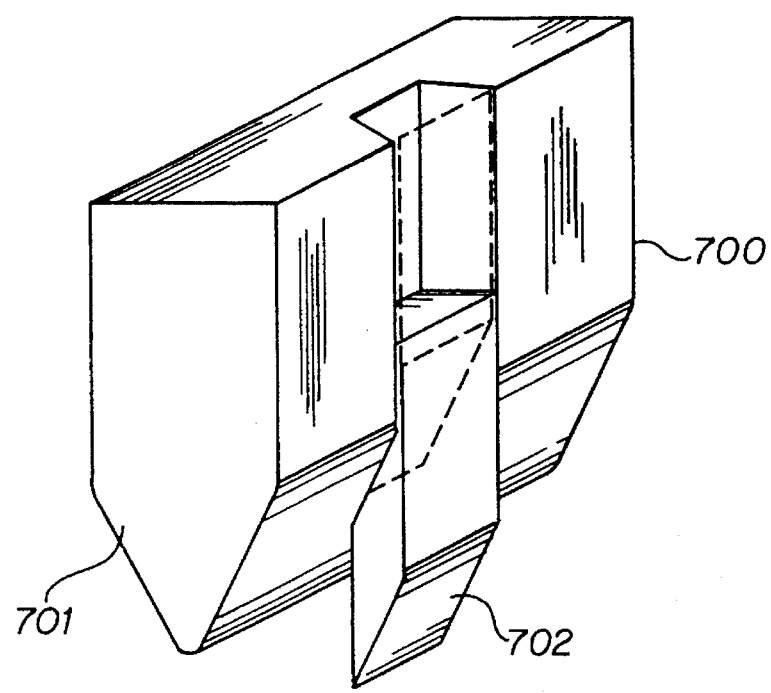
Figure 9:
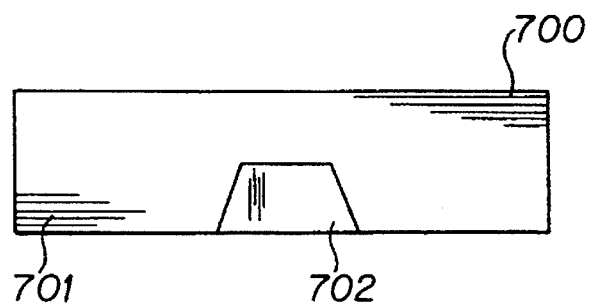

FIG. 5 is a set of chronogram illustrating the operation of the styler and of the means for determining the coordinates thereof, FIG. 6 illustrates a simulated plotted line and an actual plotted line reproduced from the simulated plotted line, FIG. 7 illustrates diagrammatically, in plan view, a plotter forming part of the system of the invention, FIG. 8 is a view, in perspective, of a fibrous plotting tip according to the invention, and FIG. 9 is a view, in horizontal section, of the plotting tip of FIG. 8.

It will be noted preliminarily that, from one figure to another, identical or similar parts or elements will be designated by the same reference symbols.

Represented in FIG. 1 is a computer-aided drawing station, for example a graphics creation station, which comprises a central processing unit 100 including processing means 110 of the microprocessor kind, a random access memory 120 as well as other conventional items of equipment, not represented, such as bulk memory, input/output circuits, keyboard, etc.

The central processing unit 100 is connected to a display screen 200, constituted, for example, by a color-display high-definition liquid-crystal screen intended to display an image as it is being created.

A back-projection device 300 enables the image present on the screen 300 to be back-projected from behind it onto a translucent screen 400.

The translucent screen 400 comprises a translucent work surface 402 surrounded by an opaque frame 404.

Finally, the graphics system comprises a graphics-data acquisition device which comprises a stylus 502, preferably of the leadless type, and means 504 for detecting the position of the stylus (x, y coordinates) in the plane of the screen 400.

The operation of the system of the present invention is schematically the following: when an operator simulates, with the aid of the stylus 502, a plotted line on the screen 402, this plotted line is supplied to the central processing processing unit in the form of a set of x, y coordinates of the position of the stylus at various instants.

This simulated plotted line is stored in memory by the central processing unit and used to create or to update an image displayed on the screen 200, and does so in real time. This update is reproduced, via the back-projection means 300, on the translucent screen, in such a way that the artist, as he executes the simulated plotted line, can observe, in complete superposition with this plotted line, the appearance of a corresponding actual plotted line.

Of course the position detection device 500, the central processing unit 100 and the back-projection means are designed to ensure the aforementioned superposition. In particular, the numerical values of the aforementioned coordinates, transmitted by the device 500 to the central processing unit 100, are corrected by a suitable multiplying or dividing factor so that an elementary movement step at the corrected coordinates corresponds to a movement of the stylus 502, vertically or horizontally, over a distance equal to the corresponding dimension of an elementary picture element or pixel of the image formed on the translucent screen 400. For example, the resolution of the system can be of the order of 1 mm, that is to say that a pixel of the image formed on the screen 200, then projected onto the screen 400, has horizontal and vertical dimensions of the order of 1 mm, whereas a movement of the stylus horizontally or vertically over this same distance induces a variation by unity in the coordinate information after correction.

The central processing unit 100 may be constituted by any suitable graphics workstation or microcomputer, for example, it is possible to use a personal computer based on a microprocessor of the INTEL 80386 type or a more powerful type, enabling high-definition graphics images to be updated in real time. In this case, the display on the screen 200 can be produced 20 according to the VGA standard. Additionally, in such a case, the processing means 110 can store the high-definition graphics images in the random access memory 120.

The working area 402 of the translucent screen 400 may be constituted by any translucent material or stack of materials of which at least one is translucent. It is possible to use, especially, translucent glasses, plastics, papers or fabrics. Advantageously, a translucent plastic or glass, of the type used in the field of photography or cinema (slide viewers, editing tables, etc.), is used.

The system for determining the x, y coordinates of the stylus may be chosen from a vast range of available techniques.

A first family of systems consists in measuring the time of propagation of ultrasound waves emitted by the stylus in the direction of a plurality of detectors, or along the reverse path. For more details, reference may be made to patents EP-A-0,233,472, FR-A-2,574,947 and EP-A-0,312,481, the respective contents of which are incorporated in the present description by way of reference.

Another known technique consists in using a light beam. In a first case, the beam is emitted by the stylus (the case especially of patents FR-A-2,650,904 and EP-A-0,202,468) and its position is detected by detectors, such as CCD ("Charge Coupled Device")-type sensors.

In a second case, one or more beams are emitted from the edges of the working area, toward this area, and the presence of the stylus in this area leads to a projected shadow whose position, representing the same position of the stylus, is detected (the case of patents EP-A-0,125,068, EP-0,279, 652, EP-A-0,121,840 and EP-A-0,221,712).

Yet another technique consists in generating, at the stylus, acoustic shock waves obtained, for example, by producing sparks, and in measuring the time of propagation of these shock waves between the styler and microphonic detectors, for example ones with piezoelectric cells. Patents U.S. Pat. No. 3,838,212, U.S. Pat. No. 3,821,491, U.S. Pat. No. 3,626,483, U.S. Pat. No. 3,821,469 and U.S. Pat. No. 4,012,588 refer to this technique. In the example represented in FIG. 1, it is this solution which has been adopted, the stylet 502 including means for producing the acoustic shock waves and the reference 504 designating two linear microphonic detectors capable of measuring the time of propagation of the waves along the x and y axes.

Moreover, it is possible to use, in order to transmit from the stylus information representing, for example, its state or any plotted-line parameter, means for emitting/receiving in the radiofrequency domain, as described, for example, in patents EP-A-0,254,297, EP-A-0,259,841 and EP-A-0,307, 893.

The respective contents of the abovementioned patents are incorporated into the present description by way of reference.

More generally, it is advantageous to use any x, y coordinate determination device which preferably employs an undulatory or pulsed signal emitted by the stylus. In particular, this can be a light, radiofrequency, acoustic (sound or ultrasound wave) signal. Furthermore, it is advantageous to choose a device in which the stylus is bereft of a connection cord or lead, which conventionally constitutes a constraint for the user.

One possible embodiment for the system for back-projecting an image onto the translucent screen will now be described with reference to FIG. 2.

In this case, a high-definition color-display liquid-crystal screen 200 is used, fixed to the surface of a back-projection device of conventional type, of the type comprising a casing 302 housing a light source and a system of lenses which directs a focused light beam carrying the image displayed on the screen 200 laid on the casing toward a mirror 304 whose tilt can be adjusted, which image is reproduced by means of transparency.

The mirror 304 reflects this image toward the rear of the translucent screen 400. The position of the screen 400 is preferably slightly tilted with respect to the vertical, in order to enable the artist to work under the same conditions as in front of an easel.

In order to avoid possible parallax error problems due to an orientation of the screen 400 which is not perpendicular to the central direction of the incident beam, it is possible to arrange the screen 200 on the casing of the back-projection apparatus with a tilt chosen correspondingly.

Of course, any other configuration of the back-projection device may be envisaged. In particular, in order to render the system of the invention more easily transportable, the screen 200, the back-projector 300 and the translucent screen 400 may be connected to each other in an articulated and folding manner.

In all the aforementioned x, y coordinate determination systems, simply the position of a simulated plotting tip of the stylus 502 is detected in the plane of the working area. According to an important ancillary aspect of the present invention, means are provided to detect not only the position of the tip of the stylus, but also the orientation of the tip. Thus, in order to simulate perfectly the case where the artist desires to produce traces of variable width, as with a plotting tip which is bevelled and/or has an elongate cross section, it is necessary to know, at any instant, the orientation of the instrument with respect to a tangent to the plotted line produced.

For this purpose, and now with reference to FIGS. 3 and 4, the stylus 502 comprises two separate signal emitters or transducers 5021 and 5022, the emitter 5021 simulating one end of an elongate plotting tip whereas the emitter 5022 is positioned in such a way that the straight-line segment linking the emitters 5021 and 5022 defines an orientation vector of the stylus. For example, this vector may be coincident with the major axis of that which would be a plotting tip of elongate transverse cross section.

The means for determining the x, y coordinates are, in this case, designed to detect the coordinates both of the emitter 5021 and of the emitter 5022.

For example, it is possible to provide in the stylet 502 a microcontroller 5023 or the like which is clocked by an appropriate clock 5024 and which controls, on the one hand, an emitter of a radiofrequency signal, composed of an emission/modulation circuit 5025 and of an antenna 5026 and, on the other hand, two emitters of acoustically propagated signals, comprising a generator 5027 of the said signals and the two transducers 5021 and 5022, which can be constituted, in this case, by sparking systems, by piezoelectric cells, etc.

The operation of the device will now be described with reference to FIG. 5. This figure illustrates in succession, from top to bottom, the radiofrequency signals emitted by the stylus, the acoustic signals emitted by the stylus, the radiofrequency signals received by the reception part 504 of the device 500, the acoustic signals received by the microphonic sensor for detecting the x-position of the part 504 and the acoustic signals received by the microphonic sensor for detecting the y-position of the part 504.

At an instant $t_0$, the microcontroller 5023 commands the emitter 5025, 5026 to emit a radiofrequency synchronization signal, denoted SE0 in FIG. 5. The microcontroller then causes the emission by the first transducer 5021 of a first acoustic signal SE1 after a time interval T1 and the emission by the second transducer 5022 of a second acoustic signal denoted SE2 after a time interval T2, these intervals T1, T2 being fixed and predetermined, and known by the microcontroller 5023.

The reception part receives the signal SE0 virtually instantaneously, because of the very high speed of propagation inherent to the electromagnetic waves, in order to form the reception synchronization signal SR0 from which the part 504 starts to measure the time, for example by triggering a suitable digital counter.

The microphonic x-position sensor receives the acoustic pulses SE1 and SE2 at instants retarted by T1x and T2x with respect to $t_0$ (signals denoted SR1x and SR2x), whereas the microphonic y-position sensor receives these acoustic pulses at instants delayed by T1y and T2y with respect to $t_0$, these delays being determined within the microcontroller by virtue of the aforementioned counting.

The coordinate x1 of the transducer 5021 is obtained from the time of propagation T1x-T1 of the acoustic signal between the said transducer 5021 of the stylus and the x-position sensor. Its coordinate y1 is derived in the same way from the measured time of propagation T1y-T1.

The coordinates x2, y2 of the transducer 5022 are determined in the same way from the times of propagation T2x-T2 and T2y-T2.

These data are acquired by the device 500 at a suitable rate, for example a few hundred to a few thousand times per second.

For each pair of coordinates x1, y1 and x2, y2, the device 500 or the central processing unit 100 (preferably the central processing unit) builds up the orientation vector V0 of the stylus, the coordinates of which are equal or proportional (x2-x1, y2-y1). This vector V0 can, if required, be normed.

The central processing unit stores the plotted line simulated on the screen 400 by the artist in the form of a succession of coordinates (x1, y1) of the central point of the stylus, taken to represent an edge or end of a plotting instrument tip having an elongate cross section, and of coordinates of the orientation vector associated with this point. In other words, the various components of the image are stored in vector mode.

In order to reveal this plotted line in real time on the screen 400, a plotted line width is calculated from each value of vector V0 and of the vector tangential to the plotted line produced. The tangent vector may, for example, be obtained from the current coordinates x1, y1 of the tip 5021 and from the coordinates, determined immediately previously, of the said tip, by simple difference.

The value of the plotted line width may be obtained by making use, for example, of the scalar product between the current orientation vector and the current tangent vector.

Represented in FIG. 5 is a simulated plotted line with which are associated, at more or less regular intervals, depending on the regularity of the speed of plotting by the user, a plurality of coordinates (x1, y1) and of orientation vectors V0. The angle between the tangent vector VT and the associated orientation vector is denoted $\alpha$.

Represented in parallel with this plotted line is a displayed plotted line. It is observed that its width l varies increasingly as a function of the value of the angle $\alpha$ and assumes a predetermined maximum value when this angle equals 90°.

Of course, other plotted-line parameters may be transmitted with the synchronization and positioning signals emitted by the stylus 502.

Thus, the stylus may include a switch (reference 5028 in FIG. 3) which enables the user to choose from among a plurality of simulated plotting tip widths. The position of this switch can be encoded into the radiofrequency or acoustic signals emitted by the stylus, in order to indicate to the central processing unit 100, via the reception part 504 of the device 500, the maximum width which the plotted line formed on the image can have. For example, it is possible to provide a three-position switch 5028 corresponding to widths, for example of 5, 8 and 12 mm, of the simulated plotting tip.

The signals emitted as a function of the position of the switch can be encoded by any suitable technique. For example, it is possible to choose, for the radiofrequency signal, a different frequency depending on the said positions it is also possible to frequency modulate the said signal. The same kind of processing can be applied, as a variant, to the acoustic signals.

Furthermore, the radiofrequency and/or acoustic signals may also carry information relating to other plotted-line parameters. For example, a load sensor, advantageously of the piezoelectric type, may be provided in order to generate an analog electrical signal representing the force with which the stylus bears on the surface of the screen 400. This signal may be carried in the signals emitted by the stylus, preferably by modulation. Advantageously, this signal is also used to detect the beginnings of plotted lines (cases where the detected pressure passes from a zero to a nonzero value) and, conversely, the ends of a plotted line.

The pressure information may advantageously be exploited in order to produce, on the back-projected image and/or on the printed image, different densities of color as a function of the pressure exerted by the stylus 502 on the screen 400.

Furthermore, the plotted-line parameters may be chosen from the colors of the plotted line. Additionally, the widths of the plotted line, the plotted line bearing forces, and the orientation of the stylus may also be indicative of the plotted-line parameters.

A push button may also be provided on the stylet in order to enable the user to choose parameters such as simulated plotting tip shape, plotted-line width, plotted-line color, etc. For example, pressing manually in succession on such a push button enables the various colors available to be displayed in succession on the screen in a frame specially provided for this purpose.

As has been indicated, the system of the invention enables an image back-projected onto a screen 400 to be updated in real time as a function of the plotted lines simulated directly on this screen. The system may also include means for printing the images produced. Of course, it is possible to use color printers of conventional type. It is also possible to use plotters having interchangeable plotting instruments.

Represented in FIG. 7 is such a plotter 600. According to the invention, the plotting instrument 602 which may be an instrument of the felt-tip type, the tip of which has an elongate cross section, is mounted on a support 604 which can rotate about an axis perpendicular to the plane of the plotter, which support is driven by a suitable motor 606. The rotation of this motor is controlled by a control unit 608 receiving information from the central processing unit 100. The support 604 and the instrument 602 are rotated as a function of the successive orientation-vector information items stored in the memory 120 in order to impart to the instrument an orientation, with respect to the tangent to the plotted line produced, which corresponds precisely to the orientation of the stylus, determined as described hereinabove.

In this way, a plotted line whose variations in width accurately follow the variations in width induced by the changes of orientation of the stylus during the plotting simulation is reproduced on a paper medium placed on the plotter and, moreover, reproduced in real time in the back-projected image.

Illustrated in FIGS. 8 and 9 is a fibrous tip 700 for a plotting instrument. This tip includes a first part 701, of elongate rectangular transverse cross section and having a doubly beveled end, and a second part 702, which is received in a sheath (not represented) so as to be able to slide vertically with respect to the first part, between a low position (solid lines) in which the part 702 projects beneath the fixed part 701, and a high position (dashed lines) in which the part 702 is set back with respect to the part 701.

It is observed in FIG. 9 that the part 702 occupies only part of the thickness of the tip, in this case approximately half of this thickness. It is also observed that the movable part 702 has a trapezoidal cross section. Other cross sections can, of course, be envisaged.

The tip 701 has a first predetermined width, for example 5, 8 or 12 mm, whereas the tip 702 has a substantially smaller average width, for example 1 mm.

By virtue of this arrangement, when the tip 702 is in the high position, the fixed tip 701 enables a plotted line of large width to be produced with a homogeneous density of color, because no discontinuity exists in the width of the tip.

When the tip 702 is in the low position, it enables much narrower plotted lines to be produced.

The position of the movable part 702 may be controlled by suitable electromechanical means (electromagnet or the like) from central processing unit 100. More precisely, the plotting-tip width information, supplied as indicated above to the central processing unit from a switch of the type of the switch 5028 provided on the stylus, is stored in the image memory 120 of the central processing unit and applied to the plotter in order to lower or raise the movable part 702 selectively in order to obtain the required width of tip.

Of course, the present invention is in no way limited to the embodiments described hereinabove and represented in the drawings, but the person skilled in the art will be able to make thereto any variant or modification in accordance with its spirit.

In particular, it applies not only to the back-projection system as described above, but, more generally, to any graphics plotted-line acquisition device, such as a graphics tablet.

Moreover, the invention applies advantageously in all the cases where a user has to be able to create or modify an image having large dimensions. This may be a graphics-creation system or even a tool for presenting variable information for educational or some other use.

In particular, it is possible to provide for the back-projection system, or a second back-projection system, to project a fixed image, such as a slide or a frozen video image, the styler then being used to "trace" contours or the like appearing on the fixed image and to store them in the central processing unit 100. By virtue of this aspect of the present invention, it is thus unnecessary to carry out point-by-point exploration ("scanning") of the fixed image, as is the case when it is a question of causing the image to appear on a computer monitor, its back-projection onto the translucent screen 400 alone being sufficient.

I claim:

1. A graphics drawing system, comprising:

a drawing surface;

a stylus capable of being moved over the surface in order to simulate plotted lines;

means for determining the coordinates of the stylus in the plane of the surface with respect to a reference;

processing means connected to the coordinate determination means, in order to create or update a digital image by using the coordinates of the stylus; and means for displaying the image on a screen, which display means are connected to the processing means; and wherein the means for determining the coordinates of the stylus comprise means to determine the coordinates of a tip of the stylus and means to determine an angle of the stylus with respect to the drawing surface, wherein the means for displaying includes means for displaying the image that includes a line having a width that is determined as a function of the angle of the stylus with respect to the drawing surface.

2. The system according to claim 1, wherein the means for determining the coordinates of the stylus comprise means for emitting undulatory or pulsed signals from the said tip of the stylus and from a point offset with respect to the said tip, and reception means provided in the region of the edges of the said surface in order to determine the said coordinates and the said angle as a function of at least one parameter of the undulatory or pulsed signals received, the angle being determined as a function of the determined coordinates of the said tip and of the said offset point.

3. The system according to claim 2, wherein the emission means comprise means for emitting acoustically propagated signals and means for emitting a radiofrequency wave enabling the emission means and the reception means to be synchronized with a view to measuring the time of acoustic propagation of the said acoustically propagated signals between the tip and the offset point of the stylus on the one hand, and the reception means on the other hand.

4. The system according to one of claims 1 to 3, wherein the processing means comprise means to store the simulated plotted lines in vector mode.

5. The system according to claims 1 to 3, wherein there are furthermore provided, in the stylus means for selecting and/or for modulating the undulatory signal emitted as a function of at least one plotted-line parameter, and that there are provided, in association with the coordinate determination means, means for analyzing and/or for demodulating the undulatory signal received by the reception devices, capable of supplying to the processing means, in conjunction with coordinate information, information representing one or more plotted-line parameters.

6. The system according to claim 5, wherein the plotted-line parameters are chosen from the group comprising the colors of the plotted line, the widths of the plotted line, the plotted line bearing forces and the orientation of the stylus.

7. The system according to claim 6, wherein the stylus includes a switching means forming a selector of the simulated tip width, connected to the means for emitting the undulatory signal so as to cause the emission by the said means of different waves according to a simulated width of plotting tip of the stylus the width being fixed by the position of the switching means.

8. The system according to claim 1, wherein the processing means comprise a computer, the computer comprising means for storing a high definition digital image, in that the display means comprise means for back-projecting the digital image onto a translucent screen and in that the drawing surface constitutes the translucent screen.

9. The system according to claim 8, further comprising variable masking means to limit the size of a working area of the translucent screen.

10. The system according to claim 1, further comprising means for printing the image on a physical medium, the printing means comprising a plotter controlled by the processing means and including at least one plotting instrument capable of producing lines of different width as a function of its orientation, and means for causing the orientation of the said instrument to vary as a function of the angle of the stylus with respect to the drawing surface.

11. The system according to claim 10, wherein the plotter comprises at least one plotting instrument including a fibrous tip fed via an ink or paint reservoir, in that the fibrous tip comprises a first part and a second part, wherein the first part is rigidly attached to a body of the plotting instrument and the second part can slide in a sheath essentially vertically with respect to the first part so as to project selectively beyond the first part, and means for moving the second part with respect to the first part as a function of simulated tip width information received from the processing means.

12. The system according to claim 11, wherein the first part of the fibrous tip has an elongate shape in transverse cross section, and includes two long opposite edges and in that the second part has a thickness less than the distance between the long edges.

13. The system according to claim 12, wherein the second part of the fibrous tip may be brought either into the projecting position or into a position located set back with respect to the first part so as not to contribute to the plotted line.

14. A method for graphically drawing images, comprising the steps of:

determining a relative location of a stylus with respect to a drawing surface;

determining an angle of the stylus with respect to the drawing surface; and displaying an image, in response to the relative location and the orientation vector, wherein a width of line segments of the image is a function of the angle of the stylus with respect to the drawing surface.

15. The method of claim 14, wherein the step of determining an angle includes the steps of:

emitting a signal from a tip of the stylus;

emitting a signal from a point offset from the tip of the stylus; and determining an angle from the distance between the signal emitting from the tip of the stylus and the signal emitting from the point offset from the tip of the stylus.

16. The method of claim 14, wherein the step of determining an angle includes the steps of:

emitting a radio frequency synchronization signal from the stylus;

emitting first and second acoustic signals from the stylus;

receiving the radio frequency synchronization signal;

receiving the first acoustic signal at a first time and the second acoustic signal at a second time; and determining the angle in response to a difference between the first time and the second time.

17. The method of claim 14, wherein the step of determining an angle includes the step of:

selectively operating a maximum width switch on the stylus, the maximum width switch defining a maximum width of the line segments of the image that is displayed.

18. A system for graphically drawing images, comprising:

a stylus;

a drawing surface;

means for determining a relative location of the stylus with respect to the drawing surface;

means for determining an angle of the stylus with respect to the drawing surface; and means for displaying an image, in response to the relative location and the orientation vector, wherein a width of line segments of the image is a function of the angle of the stylus with respect to the drawing surface.

19. The system of claim 18, wherein the means for angle includes:

means for emitting a signal from a tip of the stylus;

means for emitting a signal from a point offset from the tip of the stylus; and means for determining the angle from the distance between the signal emitting from the tip of the stylus and the signal emitting from the point offset from the tip of the stylus.

20. The system of claim 18, wherein the means for determining an angle includes:

means for emitting a radio frequency synchronization signal from the stylus;

means for emitting first and second acoustic signals from the stylus;

means for receiving the radio frequency synchronization signal;

means for receiving the first acoustic signal at a first time and the second acoustic signal at a second time; and means for determining an orientation vector in response to a difference between the first time and the second time.

21. The system of claim 18, wherein the means for determining an angle includes:

means for selectively operating a maximum width switch on the stylus, the maximum width switch defining a maximum width of the line segments of the image that is displayed.

22. The system according to claim 4, wherein there are furthermore provided, in the stylus means for selecting and/or for modulating the undulatory signal emitted as a function of at least one plotted-line parameter, and that there are provided, in association with the coordinate determination means, means for analyzing and/or for demodulating the undulatory signal received by the reception devices, capable of supplying to the processing means, in conjunction with coordinate information, information representing one or more plotted-line parameters.

23. The system according to claim 22, wherein the plotted-line parameters are chosen from the group comprising the colors of the plotted line, the widths of the plotted line, the plotted line bearing forces and orientation of the stylus.

24. The system according to claim 23, wherein the stylus includes a switching means forming a selector of the simulated tip width, connected to the means for emitting the undulatory signal so as to cause the emission by the means of different waves according to a simulated width of plotting tip of the stylus the width being fixed by the position of the switching means.

* * * * *